Nov. 17, 1959   E. B. CUSHENBERRY   2,913,699
ELECTRICAL BONDING CLAMP
Filed Jan. 10, 1955
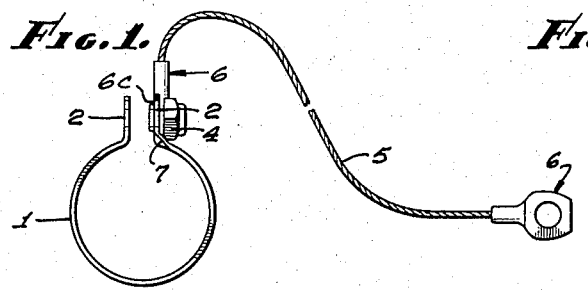
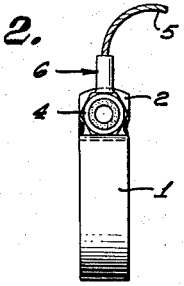
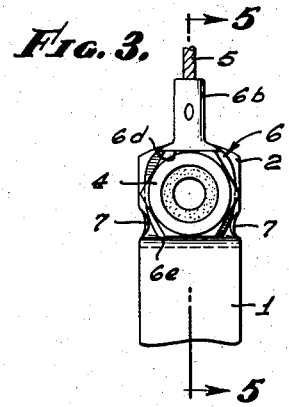
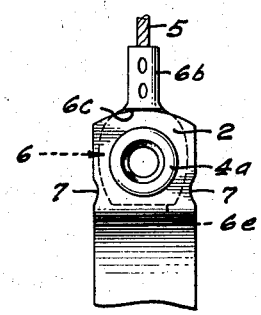
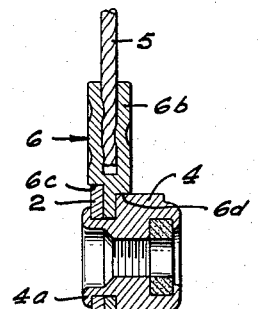
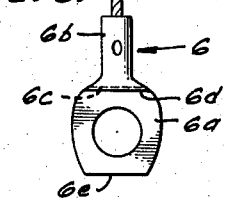
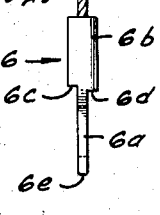
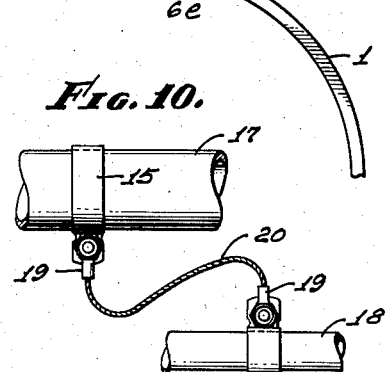
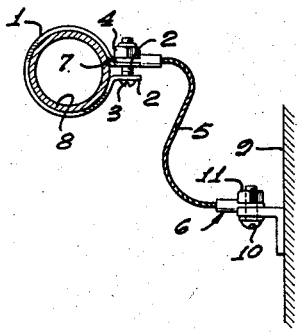
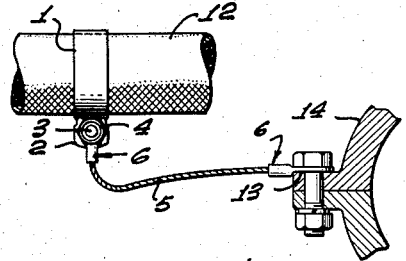
INVENTOR.
EDWARD B. CUSHENBERRY,
BY
Paul A. Weilein
ATTORNEY.

United States Patent Office 2,913,699
Patented Nov. 17, 1959

2,913,699
ELECTRICAL BONDING CLAMP

Edward B. Cushenberry, North Hollywood, Calif., assignor to Thomas Associates, Los Angeles, Calif., a partnership Application January 10, 1955, Serial No. 480,628

7 Claims. (Cl. 339—251)

This invention relates to devices for electrically bonding and thereby "grounding" the conduit lines in aircraft to metal structure of the aircraft.

It is known that objectionable and dangerous electrical charges are developed in such conduit lines. Static electricity is developed therein during operation of the aircraft. Moreover, heavy electric charges are sometimes imposed on these lines. These heavy charges may be caused by electrical storms or as a result of the lines or the metal of the aircraft being accidentally contacted by a "live" portion of electrically operated devices employed in inspecting or repairing the aircraft.

In consequence it is essential to provide a positive bonding of such conduit lines to the metal of the aircraft, with conductor means of such construction, arrangement and capacity as will assure an electrically tight "ground" connection. This will prevent the fugitive electric charges in the conduit lines from creating fire hazards or interfering with the operation of radio and radar equipment or similar sensitive instruments in the aircraft.

It has been found that pigtail connections made with conductors of adequate capacity may be used satisfactorily to ground the conduit lines in aircraft. Conductors for such connections require that each terminal of the numerous conductors installed for each aircraft, must be applied and made electrically tight by hand. This entails a great deal of time and labor with no assurance that each terminal connection will be made properly.

Accordingly, it is an object of this invention to provide an electrical bonding unit by means of which a reliable pigtail "ground" connection may be quickly and easily made between a conduit line and metal structure of an aircraft, or between two such lines, with an appreciable saving in time and labor and the assurance that the connections will be electrically tight and effective to eliminate fire hazards and the objection heretofore encountered.

It is another object hereof to provide an electrical bonding clamp such as described wherein a nut employed in connection with a bolt for fastening the clamp upon a conduit, is fixed on an end of the clamp in a novel manner maintaining a terminal member of a pigtail conductor in a permanent electrically tight connection with the clamp.

Another object of this invention is the provision in a clamp such as described of a pigtail conductor having a terminal member which engages the nut and the clamp in such a manner as to restrain rotation of the terminal member and the nut relative to one another as well as relative to the clamp, thereby maintaining a tight connection of the conductor with the clamp.

It is a further object of this invention to provide a clamp such as described in which a metal strap formed as a conduit-embracing loop is provided with an apertured ear to which the nut is riveted so as to permanently hold the terminal member of the pigtail conductor in electrically tight engagement with the ear.

Another object of this invention is the provision in a clamp such as described, of simple struck-out portions thereof which serve the dual purpose of reinforcing the clamp and preventing rotation of the nut and the terminal member whereby the nut and the terminal member are cooperative to maintain the terminal member in electrically tight engagement with the clamp.

Another object of this invention is to provide a bonding unit which in one form comprises a pair of clamps to which both terminals of a pigtail conductor are permanently fixed in electrically tight connection therewith in the manner hereinbefore described, whereby the unit readily and easily may be installed to "ground" a pair of conduits one to the other.

Another object of the invention is the provision of a novel pigtail conductor for bonding purposes such as described, wherein the terminal members are of special formation to assure that electrically tight connections may be made therewith.

This invention possesses many other advantages and has other objects which may be made more easily apparent from a consideration of one embodiment of the invention. For this purpose there is shown a form in the drawings accompanying and forming part of the present specification. This form will now be described in detail, illustrating the general principles of the invention; but it is to be understood that this detailed description is not to be taken in a limiting sense, since the scope of the invention is best defined by the appended claims.

Fig. 1 is a side elevation of an electrical bonding clamp embodying the present invention;

Fig. 2 is an elevational view taken at right angles to the clamp shown in Fig. 1;

Fig. 3 is an enlarged fragmentary elevational view showing the manner of bonding a terminal of the pigtail conductor to an end of the clamp;

Fig. 4 is a rear view of the portion of the clamp shown in Fig. 3;

Fig. 5 is a sectional view taken on the line 5—5 of Fig. 3, on an enlarged scale;

Fig. 6 is a top plan view of a terminal member of the pigtail conductor;

Fig. 7 is a side elevation of the terminal member shown in Fig. 6;

Fig. 8 is an elevational view partly in section of a typical installation of a clamp embodying this invention;

Fig. 9 is an elevational view of another type of installation of the clamp; and

Fig. 10 is an elevational view of a modified form of clamp as installed to form a bond between two conduit lines.

As shown in the accompanying drawing, an electrical bonding clamp embodying the present invention is adapted for making a "ground" connection between a conduit line in an aircraft and metal structure of or in the aircraft, or a "ground" connection between a pair of adjacent conduit lines.

In accordance with this invention, the clamp includes a metal strap 1 formed as a loop adapted to embrace a conduit or tube and having apertured ears 2 at its ends.

As here shown, the clamp is adapted to be fastened in clamping engagement with a conduit by means of a screw 3 and a nut 4, the nut being fixed to an ear 2 of the clamp in a particular manner which will be hereinafter fully described.

As it is desired to provide reliable "ground" connections such as above noted, a flexible pigtail conductor 5 is permanently fixed at one end to one ear 2 of the clamp. This conductor is provided at its ends with apertured terminal members 6 of special construction which assures that electrically tight connections may be made therewith.

In the form of the electrical bonding clamp as shown in Figs. 1–9, one of the terminal members 6 is disposed between the nut 4 and the outer face of one ear 2, being held by the nut in electrically tight contact with this ear. Accordingly, the nut 4 includes as an integral part thereof, a tubular rivet portion 4a which is extended through the apertures of the terminal member 6 and the ear 2 and riveted against the inner face of the ear as shown in Figs. 4 and 5. This causes the terminal member 6 to be tightly clamped against the ear 2 so that a permanent, electrically tight connection is provided between the conductor 5 and the clamp.

It is desired to prevent rotative movement of the nut 4 and the terminal member 6 relatve to one another as well as relative to the ear to which these elements are secured, to assure that an electrically tight connection will be maintained between the terminal member and the clamp.

Accordingly, the clamp, the nut and the terminal member are constructed and arranged so that they will cooperate to prevent rotative movement of the terminal member and nut.

Each terminal member 6 is formed between the flat apertured body 6a thereof and the tubular conductor-clamping shank 6b thereof, with transverse shoulders 6c and 6d. The shoulder 6c is disposed to engage the outer end edge of one of the ears 2 of the clamp to prevent rotation of the terminal member relative to this ear. The shoulder 6d is disposed to engage the flat surface of the nut 4 next adjacent the outer end of the ear 2, to prevent relative rotation between the nut and the terminal member. In addition to the shoulders, the terminal members 6 have straight end edges 6e. Thus the one terminal member 6 secured by the nut 4, has the edge 6e disposed in contact with the loop adjacent the ear 2 to aid in preventing this terminal member from being rotated.

Moreover the nut 4 has a flat peripheral surface engaged with the loop adjacent the ear 2 to restrain rotation of the nut.

As an additional rotation preventing means which also reinforces the clamp at the juncture of the ears 2 with the loop, the strap 1 is struck out to form small flange portions 7 adjacent the side edges of the clamp. These flange portions on the ear to which the nut is riveted, are engageable by the nut to restrain rotative movement of the nut.

It will now be seen that the nut 4 is riveted to one of the ears 2 in such a manner that a terminal member 6 is clamped upon the outer face of the ear, a flat face on the periphery of the nut abuts the loop adjacent the ear 2, the edge 6e of the member 6 abuts the loop, the shoulders 6c and 6d respectively abut the end edge of the ear and the flat face of the nut adjacent the outer end of the ear, and the nut is disposed between the flange portions 7. These abutting portions assure that the nut 4 and terminal member 6 are prevented from rotative movement and that the nut, by reason of being riveted to the ear, will maintain the terminal member 6 tightly clamped against the ear.

As shown in Fig. 8 a clamp embodying this invention is clamped upon a conduit 8 which is grounded to a metal structure 9 as in an aircraft, by securing the free terminal member 6 of the conductor 5 to such structure by means of a screw 10 and nut 11, or by any other suitable means providing for a good electrical connection.

Another example of the use of the clamp is shown in Fig. 9, wherein a shielded cable or conduit 12 having the clamp clamped thereon, is grounded as at 13 by means of the conductor 5 to a metal structure 14 which is here shown as part of an engine frame in an aircraft.

A modified form of this invention as shown in Fig. 10 embodies two clamps 15 and 16 each identical in construction with the clamp shown in Figs. 1–5. These clamps are employed to bond or "ground" a pair of conduit lines 17 and 18 one to the other. Accordingly, the terminal members 19 of pigtail conductor 20 are of the same construction as the terminal members 6 shown in Figs. 1–9, and are permanently fixed to the two clamps 15 and 16 in the same manner as the conductor is fixed to one ear of the clamp shown in Figs. 1–5. In this connection it should be noted that the clamps are shown of different sizes for application to conduit ears of different diameters, to illustrate this adaptability of the grounding unit.

A particular advantage of this clamp is that it is not necessary to use a wrench on the nut to prevent turning of the nut and the terminal member of the pigtail, when the bolt or screw is applied to clamp the loop around a conduit.

I claim:

1. In a clamp for electrically bonding a conduit to a metal structure: a metal strap formed as a conduit-embracing loop having an apertured ear thereon; a flexible electrical conductor including an apertured terminal member disposed in contact with one face of said ear; a nut having a coaxial tubular rivet portion extending through the apertures of said terminal member and said ear and riveted against the other face of said ear to clamp the terminal member in electrical contact with said ear; said nut having a lineal edge next adjacent said terminal member engaged with the outer surface of said loop to prevent rotation of the nut; and shoulders providing lineal surfaces on opposite sides of said terminal member; said lineal surfaces extending transversely of said terminal member and engaging a lineal edge of said ear and a lineal edge of said nut respectively, to restrain rotation of said terminal member and said nut relative to said ear.

2. In a clamp for electrically bonding a conduit to a metal structure: a metal strap formed as a conduit-embracing loop having an apertured ear thereon; a flexible electrical conductor including an apertured terminal member disposed in contact with one face of said ear; a nut having a coaxial tubular rivet portion extending through the apertures of said terminal member and said ear and riveted against the other face of said ear to clamp the terminal member in electrical contact with said ear; and shoulders on opposite sides of said terminal member providing lineal surfaces engaging lineal portions of said ear and said nut respectively, to restrain rotation of said terminal member and said nut relative to said ear.

3. In a clamp for electrically bonding a conduit to a metal structure: a metal strap formed as a conduit-embracing loop having an apertured ear thereon; a flexible electrical conductor including an apertured terminal member disposed in contact with one face of said ear; a nut having a coaxial tubular rivet portion extending through the apertures of said terminal member and said ear and riveted against the other face of said ear to clamp the terminal member in electrical contact with said ear; said strap having outwardly bent portions adjacent opposite side edges thereof at the juncture of said ear with said loop; said outwardly bent portions being engaged with opposite lineal edges of said terminal member and being engageable by lineal portions of said nut to restrain rotation of said terminal member and said nut; and shoulders on said terminal member extending transversely of opposite faces thereof in spaced relation to the aperture therein; said shoulders providing lineal surfaces engaged with lineal portions of said ear and said nut respectively.

4. In an electrical bonding device; a metal strap formed as a conduit-embracing loop; said loop having an apertured end; a flexible conductor having on at least one end an apertured terminal member contacting said apertured end of said loop; and a nut fixed upon said apertured end so as to bind said terminal member in electrically tight contact with said apertured end; said terminal member having shoulders extending across opposite faces thereof engaging a transverse edge of said apertured end and a transverse portion of said nut respectively, to prevent rotation of said terminal member and said nut relative to one another and said apertured end.

5. In an electrical bonding device: a metal strap formed as a conduit-embracing loop; said loop having an apertured ear at one end; a flexible conductor having on at least one end thereof an apertured terminal member contacting said apertured ear of said loop; and a nut fixed upon said apertured ear in contact with said terminal member to bind said terminal member in electrically tight contact with said ear; said terminal member having transverse shoulders formed on opposite faces thereof in spaced relation to the aperture therein for engaging a transverse edge of said apertured ear and a transverse portion of said nut respectively to prevent rotation of said terminal member and said nut relative to one another and said apertured ear; said nut and said terminal member having edge portions for contacting said loop.

6. In a clamp for electrically bonding a conduit to a metal structure: a metal strap formed as a conduit-embracing loop having an apertured ear thereon; a flexible electrical conductor including an apertured terminal member disposed in contact with said ear; a nut; and means fixing said nut to said ear to clamp said terminal member in electrical contact with said ear; said nut having a lineal edge next adjacent said terminal member engaged with the outer surface of said loop to prevent rotation of said nut; said terminal member having a lineal edge engaged with the outer surface of said loop between said ear and the point of contact of said lineal edge of said nut with said loop to prevent rotation of said terminal member.

7. In a clamp for electrically bonding a conduit to a metal structure: a metal strap formed as a conduit-embracing loop having an apertured ear thereon; a flexible electrical conductor including an apertured terminal member disposed in contact with said ear; a nut mounted on said ear for clamping said terminal member in electrical contact with said ear; said nut having a lineal portion next adjacent said ear contacting the outer surface of said loop to prevent rotation of the nut; and a lineal shoulder on said terminal member engaged with a lineal portion of said nut that is diametrically opposite said first mentioned lineal portion of said nut to restrain relative rotation between said nut and said terminal member.

References Cited in the file of this patent

UNITED STATES PATENTS

| | | |
|---|---|---|
| 1,531,411 | Perry | Mar. 31, 1925 |
| 1,839,883 | Lee | Jan. 5, 1932 |
| 2,211,615 | Brickman | Aug. 13, 1940 |
| 2,393,481 | Smith | Jan. 22, 1946 |
| 2,531,247 | Batlle | Nov. 21, 1950 |
| 2,554,169 | Bergan | May 22, 1951 |

FOREIGN PATENTS

| | | |
|---|---|---|
| 418,400 | France | Dec. 7, 1910 |